United States Patent
Rahman

(10) Patent No.: US 10,178,030 B2
(45) Date of Patent: *Jan. 8, 2019

(54) NETWORK FOR PROVIDING APPROPRIATE CONTENT DELIVERY NETWORK SELECTION

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,058

(22) Filed: Apr. 23, 2018

(65) Prior Publication Data

US 2018/0241678 A1    Aug. 23, 2018

Related U.S. Application Data

(63) Continuation of application No. 14/793,239, filed on Jul. 7, 2015, now Pat. No. 9,954,782.

(51) Int. Cl.
*H04L 12/803* (2013.01)
*H04L 29/08* (2006.01)
(Continued)

(52) U.S. Cl.
CPC .......... *H04L 47/122* (2013.01); *H04L 45/124* (2013.01); *H04L 45/22* (2013.01);
(Continued)

(58) Field of Classification Search
None
See application file for complete search history.

(56) References Cited

U.S. PATENT DOCUMENTS 7,359,710 B2    4/2008   Benco et al.
7,975,008 B2    7/2011   Hart et al.
(Continued)

FOREIGN PATENT DOCUMENTS

WO    02075482    9/2002

OTHER PUBLICATIONS

Comtech EF Data, "Challenges & Opportunities for 3G Backhaul over Satellite," May 2011, Comtech EF Data corporation, Tempe, AZ, http://www.comtechefdata.com/files/articles_papers/WP-Challenges-Opportunities-for-3G-Backhaul-over-Satellite.pdf.
(Continued)

*Primary Examiner* — Otis L. Thompson, Jr.
(74) *Attorney, Agent, or Firm* — Akerman LLP; Michael K. Dixon; Mammen (Roy) P. Zachariah, Jr.

(57) ABSTRACT

A system for providing content delivery network selection is disclosed. In particular, the system may include receiving a request for content from a user device and determining a location of the user device based on the request for the content. Based on the location of the user device and based on one or more desired parameters, the system may include selecting a suitable content delivery network from a plurality of content delivery networks to service the request for the content. Once the suitable content delivery network is selected, the system may include providing the content to the user device by using the suitable content delivery network that was selected by the system.

20 Claims, 3 Drawing Sheets

(51) Int. Cl.
  *H04L 12/721* (2013.01)
  *H04L 12/707* (2013.01)
(52) U.S. Cl.
  CPC .......... *H04L 67/1014* (2013.01); *H04L 67/18* (2013.01); *H04L 67/327* (2013.01)

(56) References Cited

U.S. PATENT DOCUMENTS

| | | | |
|---|---|---|---|
| 8,181,206 B2 | 5/2012 | Hasek | |
| 8,438,243 B2 | 5/2013 | Lajoie et al. | |
| 8,531,944 B2 | 9/2013 | Plamondon | |
| 8,645,517 B2 | 2/2014 | Stolorz et al. | |
| 8,671,021 B2 | 3/2014 | Maharajh et al. | |
| 8,718,100 B2 | 5/2014 | Markley et al. | |
| 8,775,503 B2 | 7/2014 | Sebastian | |
| 8,812,695 B2 | 8/2014 | Luna et al. | |
| 8,943,170 B2 | 1/2015 | Li et al. | |
| 9,009,764 B2 | 4/2015 | Walker et al. | |
| 2002/0069416 A1* | 6/2002 | Stiles | H04B 7/18582 725/63 |
| 2005/0136832 A1* | 6/2005 | Spreizer | H04B 7/18567 455/3.02 |
| 2008/0167032 A1 | 7/2008 | Syed | |
| 2009/0254824 A1 | 10/2009 | Singh | |
| 2011/0179437 A1 | 7/2011 | Foti | |
| 2011/0188107 A1* | 8/2011 | Ward | G02B 27/2228 359/242 |
| 2011/0252100 A1 | 10/2011 | Raciborski et al. | |
| 2011/0295728 A1 | 12/2011 | Bulumulla et al. | |
| 2012/0096121 A1 | 4/2012 | Hao et al. | |
| 2012/0166618 A1 | 6/2012 | Dahod et al. | |
| 2012/0291104 A1 | 11/2012 | Hasek | |
| 2013/0013764 A1 | 1/2013 | Li et al. | |
| 2013/0086279 A1 | 4/2013 | Archer et al. | |
| 2013/0094445 A1 | 4/2013 | De et al. | |
| 2013/0205329 A1 | 8/2013 | Markley et al. | |
| 2013/0301415 A1 | 11/2013 | Archer et al. | |
| 2013/0304601 A1 | 11/2013 | Raciborski et al. | |
| 2013/0332574 A1 | 12/2013 | Lin et al. | |
| 2014/0136312 A1 | 5/2014 | Saksena et al. | |
| 2014/0164584 A1 | 6/2014 | Joe et al. | |
| 2014/0189089 A1 | 7/2014 | Serban et al. | |
| 2014/0215051 A1 | 7/2014 | Schlack et al. | |
| 2014/0245359 A1 | 8/2014 | De et al. | |
| 2014/0298418 A9 | 10/2014 | Cronk et al. | |
| 2014/0355446 A1 | 12/2014 | Altman | |
| 2015/0019649 A1 | 1/2015 | De et al. | |
| 2015/0043336 A1 | 2/2015 | Zhu | |
| 2015/0074232 A1 | 3/2015 | Phillips et al. | |
| 2015/0085875 A1 | 3/2015 | Phillips et al. | |
| 2015/0264437 A1* | 9/2015 | Biewer | H04N 21/4622 725/64 |
| 2015/0348110 A1 | 12/2015 | Megdal | |
| 2016/0099958 A1 | 4/2016 | Bergman et al. | |
| 2016/0359962 A1 | 12/2016 | Serban et al. | |

OTHER PUBLICATIONS

Comtech EF Data, "CTOG-250 Traffic Optimization Gateway," comtechfdata.com, Oct. 27, 2015, http://www.comtechefdata.com/files/datasheets/ds-CTOG250.pdf.

Comtech EF Data, "Advanced VSAT Series—Product Line Overview," satcomnow.com, Mar. 2010, http://www.satcomnow.com/satcom/pdf/Comtech_Advanced_VSAT.pdf.

Profen, "Advanced VSAT Solutions," profen.com, Apr. 16, 2015 http://profen.com/?1389.

Hughes Network Systems LLC, "Hughes and Lemko Corporation Demonstrate High-Speed Wireless 4G/LTE Video Calls over Satellite Backhaul," HUGHES—Connect to the future® , hughes.com, Jun. 28, 2012, http://www.hughes.com/resources/hughes-and-lemko-corporation-demonstrate-high-speed-wireless-4glte-video-calls-over-satellite-backhaul.

Business Wire, "Helius Announces Next-Generation MediaGate Router Platform; New Models Add MPEG4 and High Definition Support for Digital Signage and Distance Learning Markets," businesswire.com, Oct. 26, 2004, http://www.businesswire.com/news/home/20041026005008/en/Helius-Announces-Next-Generation-MediaGate-Router-Plafform-Models#.VS_L4pTF9hB.

Lemko, "Lemko is the Industry Leader of LTE-Over-Satellite™ Backhaul," Apr. 16, 2015, http://64.227.224.179/home/lte-over-satellite-backhaul/.

Szeto, "Press Releases: Sky-Stream Launches New IP-TV Streaming Service Based on iDirect's VSAT Platform," VT Systems, vt-systems.com, Feb. 8, 2011, http://www.vt-systems.com/press-releases/sky-stream-launches-new-ip-tv-streaming-service-based-on-idirects-vsat-plafform.

\* cited by examiner

NETWORK FOR PROVIDING APPROPRIATE CONTENT DELIVERY NETWORK SELECTION

CROSS-REFERENCE TO RELATED APPLICATION

This application is a continuation of and claims priority to U.S. patent application Ser. No. 14/793,239, filed Jul. 7, 2015, which is hereby incorporated by reference in its entirety.

FIELD OF THE INVENTION

The present application relates to technologies for content distribution networks, network selection technologies, and radio access networks, and more particularly, to a system and method for providing a network for providing appropriate content delivery network selection.

BACKGROUND

In today's society, users are increasingly utilizing network and other service providers to gain access to the Internet, access software services, request and receive various types of content, access software applications, and perform a variety of other tasks and functions. In order to handle large volumes of requests from users requesting content, services, and applications, content providers often employ the use of content delivery networks and systems to serve the content and provide the services to the users in a more efficient and effective manner. This holds particularly true when high performance, reliability, scalability, and cost savings associated with distributing the content and providing the services are important to the content providers that provide the content, services, and software applications.

While current implementations of content delivery networks have been effectively utilized by content providers to handle large volumes of requests received from users, there is still room to substantially enhance and improve content delivery networks. For example, content delivery networks and the various methods of utilizing content delivery networks may be modified so as to provide enhanced quality-of-service for users and improved network reliability. Such enhancements and improvements to content delivery networks may provide for improved customer satisfaction, increased revenue for content providers, and reduced costs associated with delivering content to users.

SUMMARY

A system and accompanying methods for providing content delivery network selection are disclosed. In particular, the system and methods may involve utilizing radio access networks (RANs) to decide which type of content delivery network would be the most appropriate to service a request from a particular user. In order to accomplish this, the system and methods may involve utilizing a very small aperture terminal (VSAT)-enabled RAN equipped with geo-location determination capabilities to select which content delivery network should be utilized to service a particular request for content that is received from a user. For example, the VSAT-enabled RAN may utilize a location of the user's device and may factor in the type of content being requested by the user to determine whether an internet protocol television content delivery network or a satellite content delivery network should be utilized to service the user's request for content. In certain embodiments, the VSAT-enabled RAN may perform the content delivery network selection based on additional parameters, such as, but not limited to, setup response time, end-to-end content delivery delay metrics, quality-of-service requirements, network congestion levels, desired types of service, network bandwidth levels, and other such parameters. Furthermore, in certain embodiments, the systems and methods may take advantage of utilizing a shared content source environment, which may be utilized by each type of content delivery network to obtain desired content.

In one embodiment, a system for providing content delivery network selection is disclosed. The system may include a memory that stores instructions and a processor that executes the instructions to perform various operations of the system. The system may perform an operation that includes receiving a request for content from a user device. In response to receiving the request for the content, the system may perform an operation that includes determining a location of the user device. The system may then perform an operation that includes selecting, based on the location of the user device and based on a content type associated with the content, a first content delivery network is suited to provide the content to the user device. The first content delivery network may be selected from a plurality of content delivery networks. Once the first content delivery network is selected, the system may perform an operation that includes providing, in response to the request and by utilizing the first content delivery network that is suited to provide the content to the user device, the content to the user device.

In another embodiment, a method for providing content delivery network selection is disclosed. The method may include utilizing a memory that stores instructions, and a processor that executes the instructions to perform the various functions of the method. The method may include receiving a request for content from a user device. Additionally, the method may include determining, in response to receiving the request for the content, a location of the user device. Furthermore, the method may include selecting, based on the location of the user device and based on a content type associated with the content, a first content delivery network that is suited to provide the content to the user device. The first content delivery network may be selected from a plurality of content delivery networks. Moreover, the method may include providing, in response to the request and by utilizing the first content delivery network that is suited to provide the content to the user device, the content to the user device.

According to yet another embodiment, a computer-readable device having instructions for providing content delivery network selection is provided. The computer instructions, which when loaded and executed by a processor, may cause the processor to perform operations including: receiving a request for content from a user device; determining, in response to receiving the request for the content, a location of the user device; selecting, based on the location of the user device and based on a content type associated with the content, a first content delivery network that is suited to provide the content to the user device, wherein the first content delivery network is selected from a plurality of content delivery networks; and providing, in response to the request and by utilizing the first content delivery network that is suited to provide the content to the user device, the content to the user device.

These and other features of the systems and methods for providing content delivery network selection are described in the following detailed description, drawings, and appended claims.

DETAILED DESCRIPTION OF THE INVENTION

Figure 1:
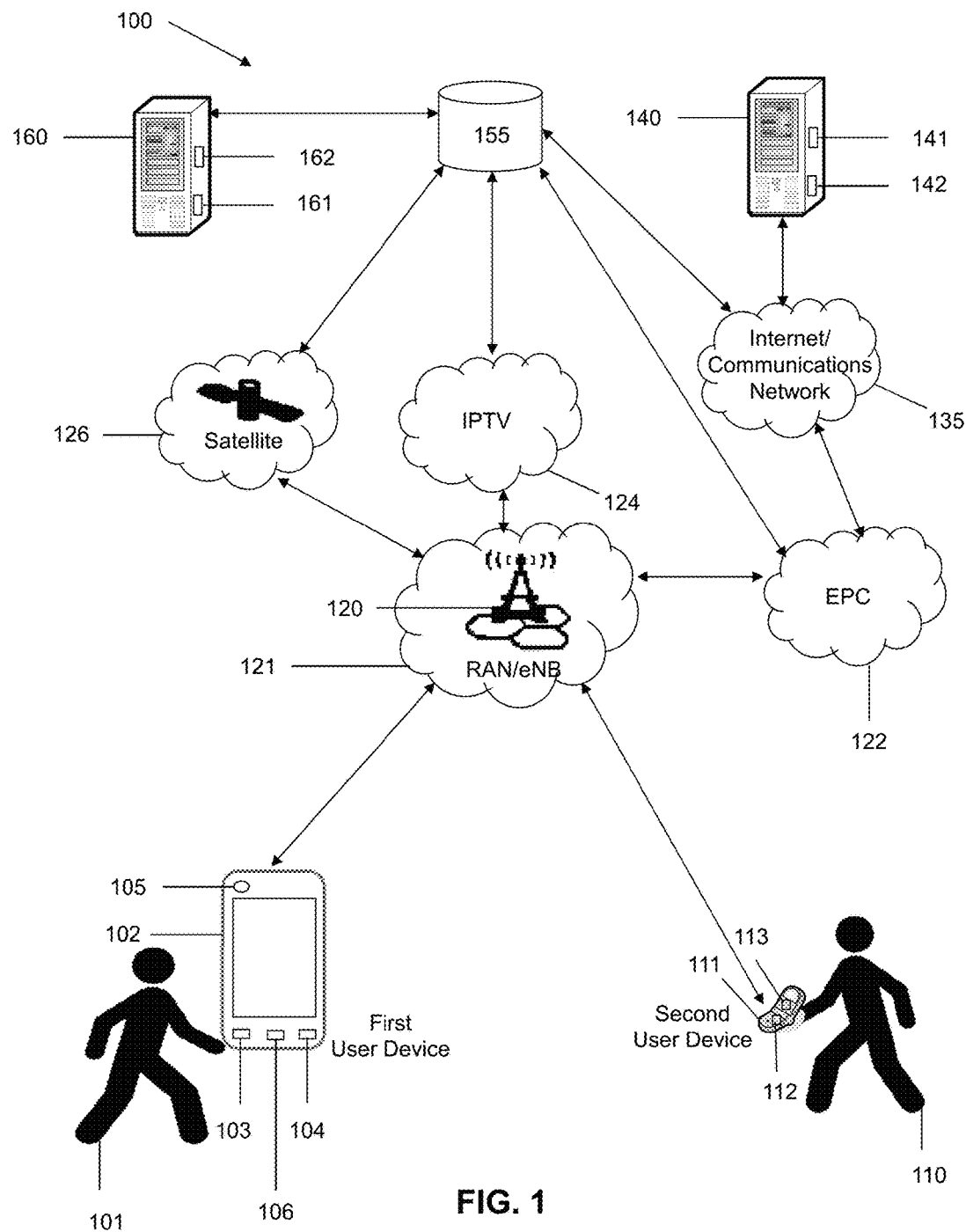
FIG. 1 is a schematic diagram of a system for providing content delivery network selection according to an embodiment of the present disclosure.
Figure 2:
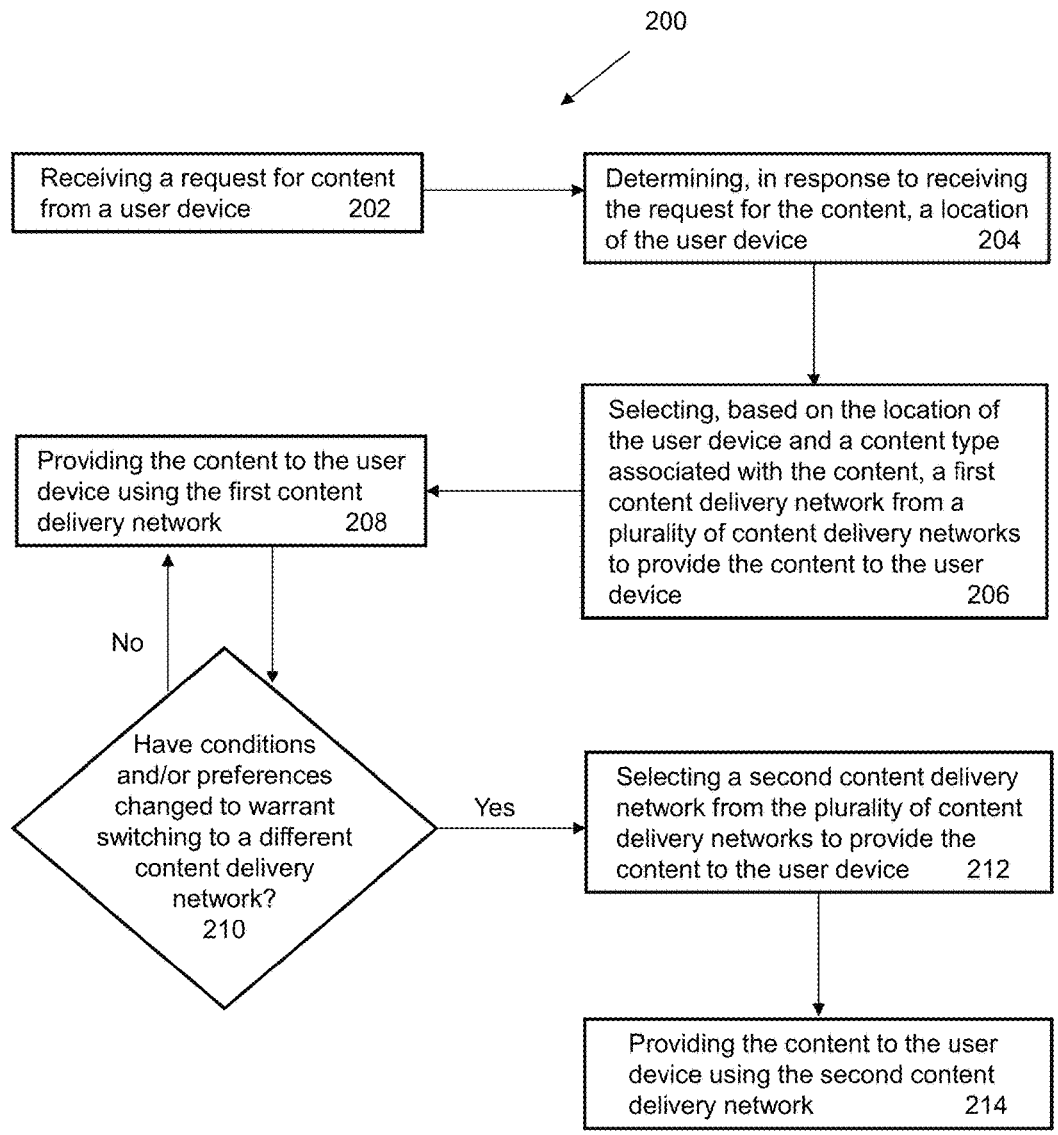
FIG. 2 is a flow diagram illustrating a sample method for providing content delivery network selection according to an embodiment of the present disclosure.
Figure 3:
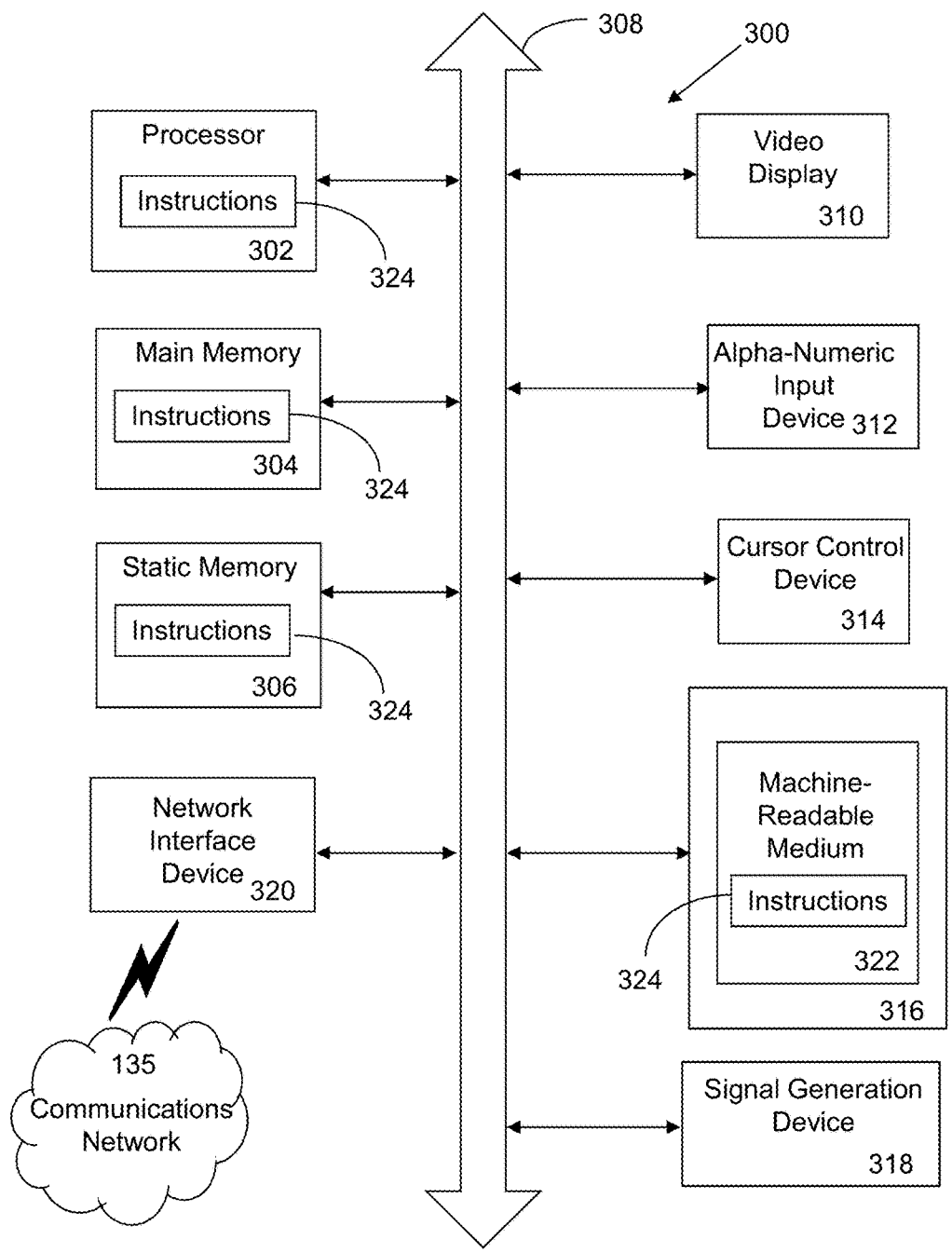
FIG. 3 is a schematic diagram of a machine in the form of a computer system within which a set of instructions, when executed, may cause the machine to perform any one or more of the methodologies or operations of the systems and methods for providing content delivery network selection.

A system 100 and accompanying methods for providing content delivery network selection are disclosed, as shown in FIGS. 1-3. In particular, the system 100 and methods may involve utilizing radio access networks (RANs) to assist in deciding which type of content delivery network would be the most appropriate to service requests for content from one or more users. In order to accomplish this, the system 100 and methods may involve utilizing a very small aperture terminal (VSAT)-enabled RAN hardware element 120, or other desired hardware element, equipped with geolocation determination capabilities to select which content delivery network 122, 124, 126 is most suitable to service each request for content. As an example, the VSAT-enabled RAN hardware element 120 may be configured utilize the locations of first and second user devices 102, 111 and may factor in the type of content being requested by users using the first and second user devices 102, 111 to determine whether an internet protocol television network 124 or a satellite content delivery network 126 should be utilized to service the user's request for content. The VSAT-enabled RAN hardware element 120 may perform the content delivery network selection based on various types of parameters, such as, but not limited to, setup response time, end-to-end content delivery delay metrics, quality-of-service requirements, network congestion levels, desired types of service, network bandwidth levels, other such parameters, or any combination thereof. Furthermore, in certain embodiments, the systems and methods may take advantage of utilizing a shared content source environment, which may be utilized by each type of content delivery network 122, 124, 126 to obtain the content requested by the users.

As shown in FIG. 1, a system 100 for providing content delivery network selection is disclosed. The system 100 may be configured to support, but is not limited to supporting, cloud computing services, content delivery services, satellite services, Long-Term Evolution (LTE) services, telephone services, voice-over-internet protocol services (VoIP), software as a service (SaaS) applications, gaming applications and services, productivity applications and services, mobile applications and services, and any other computing applications and services. The system may include a first user 101 that may utilize first user device 102 to access content, data, and services, to initiate and participate in communications sessions, or to perform a variety of other functions. As an example, the first user 101 may utilize first user device 102 to engage in a communications session, such as a telephone call or a chat session, with a second user 110 that may be utilizing second user device 111. As another example, the first user 101 may utilize the first user device 102 to request various types of media content from the content delivery networks 122, 124, 126, from the second user device 111, or a combination thereof.

In certain embodiments, the first user device 102 and second user device 111 may be computers, servers, mobile devices, smartphones, computer tablets, phablets, or any other computing devices. Illustratively, the first user device 102 is shown as a smartphone in FIG. 1. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. Additionally, the first user device 102 may include a camera 105, which may be utilized to capture video, image, or other content. Furthermore, the first user device 102 may also include a global positioning sensor 106 that may be configured to provide location information for the first user device 102 and location information for the first user 101 that is using the first user device 102. The second user device 111 may include a memory 112 that includes instructions, and a processor 113 that executes the instructions from the memory 112 to perform various operations that are performed by the second user device 111. The processor 113 may be hardware, software, or a combination thereof. Illustratively, second user device 111 is shown as a mobile device in FIG. 1.

The first user 101 and the second user 110 may utilize the first user device 102 and second user device 111, respectively, to participate in communications sessions with each other. Additionally, the first user 101 and the second user 110 may utilize the first user device 102 and the second user device 111 to access and obtain various types of content and services, such as, but not limited to, audio content, video content, web content, text content, any type of content, or any combination thereof. Furthermore, the first and second users 101, 110 may utilize the first and second user devices 102, 111 to perform a variety of other tasks and functions. In certain embodiments, the first user device 102 and second user device 111 may include software applications that may include a cloud-based application, gaming application, an internet-based application, a browser application, a mobile application, a productivity application, a video application, a music application, a streaming media application, a social media application, any other type of application, or a combination thereof. In certain embodiments, the software applications may include one or more graphical user interfaces for the first and second users 101, 110 so as to enable the first and second users 101, 110 to readily interact with the software applications. In certain embodiments, at least a portion of the software application may be configured to execute directly on the first user device 102 and second user device 111, however, in other embodiments, the software application may be configured to execute on the other devices and components in the system 100.

The first user device 102 and the second user device 110 may have corresponding device profiles. In certain embodiments, each of the devices in the system 100 may have its own corresponding device profile. Information included in a device profile may include, but is not limited to, information specifically corresponding to the first user device 102 and the second user device 111, information identifying the types of devices that the first user device 102 and second user device 111 are, information relating to how the first user 101 utilizes the first user device 102, information relating to how the second user 110 utilizes the second user device 111, information identifying what type of services and information the first and second user devices 102, 111 are authorized to access, information indicating each type of component included in the first and second user devices 102, 111, information identifying the processing power, storage capacity, download capabilities, upload capabilities, and content delivery services subscriptions for the first and second user devices 102, 111, any other information associated with the first and second user devices 102, 111, or any combination thereof. The device profiles may be made accessible to any device, network, or a combination thereof, in the system 100.

In addition to device profiles, the system 100 may also include user profiles. A user profile may be a profile corresponding to the first user 101, the second user 110, or any other user. For example, the first user's 101 profile may include information, such as, but not limited to, a name of the first user 101, the age of the first user 101, demographic information associated with the first user 101, information identifying the first user device 102 of the first user 101, the types of services, such as content delivery services, subscribed to by the first user 101, information identifying a location of the first user 101, information identifying the type of content the first user 101 likes, information identifying the types of applications that the first user 101 utilizes, and any other information. The user profiles may be stored directly on the first and second user devices 102, 111, the database 155, on any other device in the system 100, or on any combination thereof. Additionally, the user profiles may be accessible by the VSAT-enabled RAN hardware element 120, any device in the system 100, any network in the system 100, or a combination thereof.

The system 100 may also be configured to include a VSAT-enabled RAN hardware element 120, which may reside within a RAN 121. The RAN 121 may be configured to include one or more local area networks (LANs). In certain embodiments, the VSAT-enabled RAN hardware element 120 may include or comprise an eNodeB element, such as used in an LTE network or other similar network, and may also include any number of processors and memories. The VSAT-enabled RAN hardware element 120 may be configured to connect directly with the first and second user devices 102, 111 via the RAN 121. Additionally, the VSAT-enabled RAN hardware element 120 may include any of the functionality of a base station utilized in mobile communication networks. The VSAT-enabled RAN hardware element 120 may be equipped with geolocation determination capabilities, which may be utilized to determine the locations of the first and second user devices 102, 111. In certain embodiments, the VSAT-enabled RAN hardware element 120 may be configured to select the appropriate content delivery networks 122, 124, 126 for the first and second user devices 102, 111 to access. In certain embodiments, the VSAT-enabled RAN hardware element 120 may be configured to select the appropriate content delivery network 122, 124, 126 for the first and second user devices 102, 111 to access based on the first and second user devices' 102, 111 locations respectively. Additionally, the selections may be based on, but are not limited to being based on, the type of content requested by the first and second users 101, 110, the quality-of-service desired for the first and second users 101, 110, network congestion levels on the content delivery networks 122, 124, 126, the amount of bandwidth available for each of the content delivery networks 122, 124, 126, a time of day, a selected time period, whether a content delivery network 122, 124, 126 is being hacked or under attack, the types of services provided by the content delivery networks 122, 124, 126, or any combination thereof.

The system 100 may also include a plurality of content delivery networks 122, 124, 126. The content delivery network 122 may be an evolved packet core (EPC) network that may be configured to serve as the core network in the system 100. The EPC network 122 may be configured to provide both a voice and data networking framework for connecting the first and second users 101, 110, such as on an LTE network. In certain embodiments, the EPC network 122 may include any of the components and functionality found in traditional EPC networks 122, and may be configured to be communicatively linked with communications network 135. The content delivery network 124 may be an internet protocol television network that may be configured to deliver media content and services using an internet protocol suite and by utilizing packet switching. The internet protocol television network 124 may provide the ability to stream media requested by the first and second users 101, 110, provide live television services, provide time-shifted media, provide for media-on-demand, or any combination thereof. In certain embodiments, the internet protocol television network 124 may include any of the components and functionality found in traditional internet protocol television networks. The content delivery network 126 may be a satellite network that may utilize one or more satellites to delivery media content and services requested by the first and second users 101, 110. The satellite network 126 may include any of the components and functionality found in a traditional satellite network. The EPC network 122, the internet protocol television network 124, and the satellite network 126 may be configured to communicatively link with the VSAT-enabled RAN hardware element 120.

The communications network 135 of the system 100 may be configured to link each of the devices in the system 100 to one another, and be configured to transmit, generate, and receive any information and data traversing the system 100. In one embodiment, the communications network 135 may include any number servers, databases, or other componentry. The communications network 135 may be configured to communicatively link with the EPC network 122, the internet protocol television network 124, the satellite network 126, the server 140, the database 155, and the server 160. The communications network 135 may also include and be connected to a cloud-computing network, a wireless network, an ethernet network, a satellite network, a broadband network, a cellular network, a private network, a cable network, the Internet, an internet protocol network, a multiprotocol label switching (MPLS) network, a content distribution network, or any combination thereof. In one embodiment, the communications network 135 may be part of a single autonomous system that is located in a particular geographic region, or be part of multiple autonomous systems that span several geographic regions.

Notably, the functionality of the system 100 may be supported and executed by using any combination of the servers 140 and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. In certain embodiments, the servers 140 and 160 may be network servers, routers, gateways, computers, mobile devices or any other suitable computing device. In certain embodiments, the server 140 may be communicatively linked to the communications network 135, the EPC network 122, any network, or any combination thereof. Additionally, in certain embodiments, the server 140 may serve as a shared content source for certain types services and requests. For example, the server 140 may serve as a shared content source for real-time feeds requested by the first and second users 101, 110, as a shared content source for content of a certain resolution level, as a shared content source for certain types of content, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the EPC network 122, the internet protocol television network 124, the satellite network 126, the communications network 135, or a combination thereof. Additionally, the database 155, in certain embodiments, may serve as a shared content source for stored content that may be accessed and shared by the networks 122, 124, 126, 135 so that the networks 122, 124, 126, 135 may obtain shared content for the first and second users 101, 110 in an efficient and effective manner. As a result, the database 155 may serve as a central repository for content and information requested by the first and second users 101, 110. Furthermore, the database 155 may include a processor and memory or be connected to a processor and memory to perform the various operation associated with the database 155. In certain embodiments, the database 155 may be connected to servers 140, 160, first user device 102, second user device 111, the hardware element 120, or any combination thereof. The database 155 may also store information and metadata obtained from the system 100, store metadata and other information associated with the first and second users 101, 110, store user profiles associated with the first and second users 101, 110, store device profiles associated with the first and second user devices 101, 111, store location information, store communications traversing the system 100, store user preferences, store information associated with any device or signal in the system 100, store information relating to patterns of usage relating to the first user device 102 and second user device 111, store any information traversing the system 100, or any combination thereof. Furthermore, the database 155 may be configured to process queries sent to it by any device in the system 100.

Operatively, the system 100 may provide for appropriate content delivery network selection for servicing various user requests based on one or more parameters and by utilizing the VSAT-enabled RAN hardware element 120, or another similar device. In a first example scenario, the first user 101 of the first user device 102 may transmit, by using the first user device 102, a request for media content, such as a movie file. The VSAT-enabled RAN hardware element 120 may receive the request for the movie file from the first user device 102 and may proceed to determine the location of the first user device 102. The location of the first user device 102 may be determined by utilizing and invoking geolocation determination capabilities equipped on the VSAT-enabled RAN hardware element 120 itself, by having the VSAT-enabled RAN hardware element 120 access location information provided by the global positioning sensor 106, by utilizing any other location determination techniques, or any combination thereof. In certain embodiments, once the location of the first user device 102 is determined, the VSAT-enabled RAN hardware element 120 may determine the type of content that the first user 101 is requesting. For example, in this case, the VSAT-enabled RAN hardware element 120 may determine, based on the request, that the first user 101 is requesting a movie file and that the version of the movie file that is being requested is a high-quality 1080p version of the movie file.

The VSAT-enabled RAN hardware element 120 may then proceed to determine which content delivery network 122, 124, 126 would be the most appropriate for servicing the request for the movie file that received from the first user device 102. In certain embodiments, the VSAT-enabled RAN hardware element 120 may determine the most appropriate content delivery network 122, 124, 126 for servicing the request based on the location of the first user device 102, the type of content being requested, or both. For example, if the first user device 102 is located in a remote desert area and the satellite network 126 is the only content delivery network that is capable of servicing the request from the first user device 102, the VSAT-enabled RAN hardware element 120 may select a content delivery network path that uses the satellite network 126 to service the request for the content. As another example, if the first user device 102 is located in the first user's 101 home, the VSAT-enabled RAN hardware element 120 may select the internet protocol television network 124 as the path to service the request because the internet protocol television network 124 may be more suited to service the request. In certain embodiments, the VSAT-enabled RAN hardware element 120 may also be configured to determine which specific nodes in the selected content delivery network 122, 124, 126 would be optimal to service the request for the content.

In addition to factoring in the location of the first user device 102 and the type of content being requested, the VSAT-enabled RAN hardware element 120 may also factor in a variety of parameters when making the selection of the most appropriate content delivery network 122, 124, 126 to service the request for content. For example, the VSAT-enabled RAN hardware element 120 may base the selection of the content delivery network 122, 124, 126 based on parameters, such as, but not limited to, setup response time, end-to-end content delivery delay metrics, quality-of-service requirements, network congestion levels, desired types of service, network bandwidth levels, time period restrictions, other such parameters, or any combination thereof. Using the above example, if the VSAT-enabled RAN hardware element 120 initially selects the satellite network 126 to service the request for content, but the satellite network 126 eventually becomes congested, the VSAT-enabled RAN hardware element 120 may dynamically decide that the EPC network 122 should finish servicing the request, decide that the EPC network 122 should be utilized for servicing future requests from the first user device 102, or both. In certain embodiments, the content delivery networks 122, 124, 126 may cumulatively form a hybrid content delivery network in that multiple types of content delivery networks 122, 124, 126 may be readily selected by the VSAT-enabled RAN hardware element based on various conditions occurring in the system 100.

Once the appropriate content delivery network 122, 124, 126 is selected by the VSAT-enabled RAN hardware element 120, the selected content delivery network 122, 124, 126 may obtain the content from database 155, which may serve as a shared content source for each of the content delivery networks 122, 124, 126 and the communications network 135. In certain embodiments, the database 155 may serve as a shared content source for stored content and may provide a convenient and common location for each of the content delivery networks 122, 124, 126 to access requested content. In certain embodiments, the selected content delivery network 122, 124, 126 may obtain the content from server 140, which may also serve as a shared content source. However, the server 140 may serve as a shared content source for different types of requests, different types of services, or both. For example, the server 140 may serve as a shared content source for real-time feeds requested by the first and second users 101, 110, as a shared content source for content of a certain resolution level, as a shared content source for certain types of content, or any combination thereof. In certain embodiments, the VSAT-enabled RAN hardware element 120 may be configured to maintain a record of the content and services stored in the database 155, the server 140, or both. Additionally, the VSAT-enabled RAN hardware element 120 may be configured to maintain a record of the access options associated with the database 155, the server 140, or both. Once the content is obtained from the database 155, the server 140, or both, the selected content delivery network 122, 124, 126 may provide the content to the first user device 102.

In a second example scenario, the second user 110 may utilize the second user device 111 to request content. In this example, the VSAT-enabled RAN hardware element 120 may be configured to determine the location of the second user device 111 and a content type of the content requested. In certain embodiments, the VSAT-enabled RAN hardware element 120 may also be configured to access a user profile associated with the second user 110, a device profile associated with the second user device 111, or both. In doing so, the VSAT-enabled RAN hardware element 120 may, in certain embodiments, determine what types of quality-of-service requirements are required by the second user 110, what type of network services are required by the second user 110, what type of bandwidth the second user device 111 is capable of handling, the second user's 110 internet subscriptions, content restrictions associated with the second user device 111, the second user's 110 preferences, or any combination thereof, and factor in such parameters and information in selecting a content delivery network 122, 124, 126 for servicing the request. The VSAT-enabled RAN hardware element 120 may analyze any of the aforementioned information to determine the most suitable content delivery network 122, 124, 126 to service the request from the second user device 111.

In this example, the VSAT-enabled RAN hardware element 120 may determine that the second user 110 has subscribed to internet protocol television services and that based on the second user's 110 location and the content type of the content requested, that the internet protocol television network 124 would be the most suitable content delivery network to service the request for content. If parameters change, network conditions change, or both, the VSAT-enabled RAN hardware element 120 may switch to a different content delivery network, such as satellite network 126 or EPC network 122. The switch may be made while the request is being serviced, after the request is serviced, or at any other desired time period. In this example, the second user 110 may have requested media content associated with a real-time sports event. The internet protocol television network 124 may obtain the real-time content from the server 140, which may be configured to be a content source for real-time feeds. The internet protocol television network 124 may then proceed to deliver the content to the second user device 111.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving requests for content from user devices 102, 111, determining the locations of the user devices 102, 111, selecting a suitable content delivery network 122, 124, 126 to service the requests for content, providing the content to the user devices 102, 111 using the selected content delivery network 122, 124, 126, determining whether conditions have changed to warrant switching to a different content delivery network 122, 124, 126 to provide the content, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a hardware element 120, an EPC network 122, an internet protocol television network 124, a satellite network 126, a communications network 135, a server 140, a server 160, and a database 155. However, the system 100 may include multiple first user devices 102, multiple second user devices 111, multiple EPC networks 122, multiple internet protocol television networks 124, multiple satellite networks 126, multiple communications networks 135, multiple servers 140, 160, multiple databases 155, or any number of any of the other components in the system 100. Furthermore, in certain embodiments, substantial portions of the functionality and operations of the system 100 may be performed by other networks and systems that may be connected to system 100.

As shown in FIG. 2, an exemplary method 200 for providing content delivery network selection is schematically illustrated, and may include, at step 202, receiving a request for content from a user device. In certain embodiments, the request may be a request for a service, data, information, or anything that may be requested by a user device. In certain embodiments, the request may be transmitted by the first user device 102, the second user device 111, any combination thereof, or by any other appropriate device. In certain embodiments, the request may be received by the VSAT-enabled RAN hardware element 120, the RAN 121, or by any other appropriate device. At step 204, the method 200 may include determining, in response to receiving the request, a location of the user device, such as first user device 102 or second user device 111. In certain embodiments, the determination may be performed by utilizing the VSAT-enabled RAN hardware element 120, the RAN 121, or by any other appropriate device. The method 200 may also include determining a content type associated with the content requested by the user device.

At step 206, the method 200 may include selecting, based on the location of the user device, the content type of the content requested, or both, a content delivery network 122, 124, 126 that is most suited to provide the content to the user device. In certain embodiments, the selection may be performed by the VSAT-enabled RAN hardware element 120, the RAN 121, or by any other appropriate device. Once the content delivery network 122, 124, 126 is selected, the method 200 may include, at step 208, providing the content to the user device using the selected content delivery network 122, 124, 126. In certain embodiments, the content may be provided by utilizing the content delivery networks 122, 124, 126, the communications network 135, the VSAT-enabled RAN hardware element 120, the database 155, the server 140, the server 160, any combination thereof, or by any other appropriate device.

At step 210, the method 200 may include determining if conditions, preferences, or both, have changed to warrant switching to a different content delivery network 122, 124, 126 to service the request from the user device. In certain embodiments, the determination may be performed by the VSAT-enabled RAN hardware element 120, the RAN 121, or by any other appropriate device. If conditions, preferences, or both, have not changed to warrant switching to a different content delivery network 122, 124, 126, the method 200 may include reverting back to step 208 and continuing to service the request using the initially selected content delivery network 122, 124,126. If, however, the conditions, preferences, or both, have changed to warrant switching to a different content delivery network 122, 124, 126, the method 200 may include, at step 212, selecting a different content delivery network 122, 124, 126 to service the request for content. In certain embodiments, the selection may be performed by utilizing the VSAT-enabled RAN hardware element 120, the RAN 121, or by any other appropriate device. At step 214, the method 200 may include providing the content to the user device using the different content delivery network 122, 124, 126. In certain embodiments, the content may be provided by utilizing the content delivery networks 122, 124, 126, the communications network 135, the VSAT-enabled RAN hardware element 120, the database 155, the server 140, the server 160, any combination thereof, or by any other appropriate device.

Notably, the system 100 and methods disclosed herein may include additional functionality and features. For example, in certain embodiments, the system 100 and methods may include basing the selection of the content delivery network 122, 124, 126 on whether a particular content delivery network 122, 124, 126 is under attack, whether a particular content delivery network 122, 124, 126 is experiencing network outages, whether a particular content delivery network 122, 124, 126 is experience threshold levels of usage, the time of day, or any combination thereof. Additionally, the selection of the content delivery network 122, 124, 126 may be based on a network provider's preferences, based on a schedule, or any combination thereof. In certain embodiments, the functionality of the VSAT-enabled RAN hardware element 120 may be incorporated into any suitable hardware element, such as a base station or other similar device, and the present description is not intended to be limited to using solely a VSAT-enabled RAN hardware element 120 as the means for selecting the content delivery networks 122, 124, 126.

Referring now also to FIG. 3, at least a portion of the methodologies and techniques described with respect to the exemplary embodiments of the system 100 can incorporate a machine, such as, but not limited to, computer system 300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using EPC network 122, internet protocol television network 124, satellite network 126, communications network 135, RAN 121, another network, or a combination thereof) to and assist with operations performed by other machines and systems, such as, but not limited to, the first user device 102, the second user device 111, the hardware element 120, the server 140, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310, which may be, but is not limited to, a liquid crystal display (LCD), a flat panel, a solid state display, or a cathode ray tube (CRT). The computer system 300 may include an input device 312, such as, but not limited to, a keyboard, a cursor control device 314, such as, but not limited to, a mouse, a disk drive unit 316, a signal generation device 318, such as, but not limited to, a speaker or remote control, and a network interface device 320.

The disk drive unit 316 may include a machine-readable medium 322 on which is stored one or more sets of instructions 324, such as, but not limited to, software embodying any one or more of the methodologies or functions described herein, including those methods illustrated above. The instructions 324 may also reside, completely or at least partially, within the main memory 304, the static memory 306, or within the processor 302, or a combination thereof, during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 322 containing instructions 324 so that a device connected to the EPC network 122, the internet protocol television network 124, the satellite network 126, the internet/communications network 135, RAN 121, another network, or a combination thereof, can send or receive voice, video or data, and to communicate over the EPC network 122, the internet protocol television network 124, the satellite network 126, the internet/communications network 135, RAN 121, another network, or a combination thereof, using the instructions. The instructions 324 may further be transmitted or received over the EPC network 122, the internet protocol television network 124, the satellite network 126, the internet/communications network 135, RAN 121, another network, or a combination thereof, via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
    a memory that stores instructions; and
    a processor that executes the instructions to perform operations, the operations comprising:
        determining, in response to receiving a request for content, a location of a user device, wherein the determining of the location of the user device is performed by utilizing a very small aperture terminal-enabled radio access network hardware element;
        selecting, based on the location of the user device, a first type of content delivery network suited to provide the content to the user device, wherein the first type of content delivery network is selected from a plurality of types of content delivery networks, wherein the selecting of the first type of content delivery network is performed by utilizing the very small aperture terminal-enabled radio access network hardware element; and
        providing, in response to the request and by utilizing the first type of content delivery network that is suited to provide the content to the user device, the content to the user device.

2. The system of claim 1, wherein the operations further comprise selecting the first type of content delivery network based on a setup response time associated with delivering the content.

3. The system of claim 1, wherein the operations further comprise selecting the first type of content delivery network based on a content restriction associated with the user device.

4. The system of claim 1, wherein the operations further comprise determining the content restriction associated with the user device from a device profile of the user device.

5. The system of claim 1, wherein the operations further comprise selecting the first type of content delivery network based on a content type associated with the content.

6. The system of claim 1, wherein the operations further comprise selecting the first type of content delivery network based on an end-to-end content delivery delay metric.

7. The system of claim 1, wherein the operations further comprise selecting the first type of content delivery network based on a quality-of-service requirement.

8. The system of claim 1, wherein the operations further comprise selecting the first type of content delivery network based on a network congestion level.

9. The system of claim 1, wherein the operations further comprise selecting the first type of content delivery network based on a network bandwidth level.

10. The system of claim 1, wherein the operations further comprise selecting the first type of content delivery network based on a time period restriction associated with the content.

11. The system of claim 1, wherein the operations further comprise determining if a condition associated with the first type of content delivery network warrants switching to a second type of content delivery network to provide the content to the user device.

12. The system of claim 1, wherein the operations further comprise selecting the first type of content delivery network based on whether the first type of content delivery network is under attack.

13. The system of claim 1, wherein the operations further comprise selecting a node in the first type of content delivery network to service the request for the content.

14. A method, comprising:
   determining, in response to receiving a request for content, a location of a user device, wherein the determining of the location of the user device is performed by utilizing a very small aperture terminal-enabled radio access network hardware element;
   selecting, based on the location of the user device, a first type of content delivery network suited to provide the content to the user device, wherein the first type of content delivery network is selected from a plurality of types of content delivery networks, wherein the selecting of the first type of content delivery network is performed by utilizing the very small aperture terminal-enabled radio access network hardware element; and
   transmitting, in response to the request and by utilizing the first type of content delivery network that is suited to provide the content to the user device, the content to the user device.

15. The method of claim 14, further comprising obtaining, after determining the content type associated with the content, the content that is to be provided to the user device from a shared content source that is shared by the plurality of types of content delivery networks.

16. The method of claim 14, further comprising switching to a second type of content delivery network to service the request based on a change in a condition associated with the first type of content delivery network.

17. The method of claim 14, further comprising selecting the first type of content delivery network based on a type of service provided by the first type of content delivery network.

18. The method of claim 14, further comprising obtaining the content from a content source shared by the plurality of content delivery networks.

19. The method of claim 14, further comprising determining, by utilizing the very small aperture terminal-enabled radio access network hardware element, a type of content associated with the content.

20. A non-transitory computer-readable device comprising instructions, which when executed by a processor, cause the processor to perform operations comprising:
   receiving a request for content from a user device;
   determining, in response to receiving the request for the content, a location of a user device, wherein the determining of the location of the user device is performed by utilizing a very small aperture terminal-enabled radio access network hardware element;
   selecting, based on the location of the user device, a first content delivery network suited to provide the content to the user device, wherein the first content delivery network is selected from a plurality of content delivery networks, wherein the selecting of the first content delivery network is performed by utilizing the very small aperture terminal-enabled radio access network hardware element; and
   transmitting, in response to the request and by utilizing the first content delivery network that is suited to provide the content to the user device, the content to the user device.

* * * * *